S. E. Anthony,
Sawing Shingles.
N° 48,885.  Patented July 25, 1865.
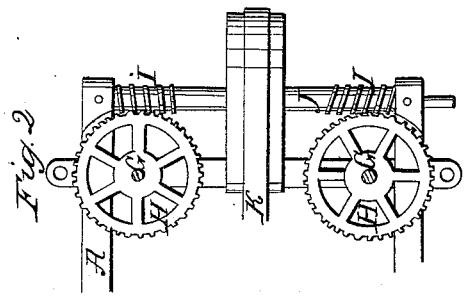
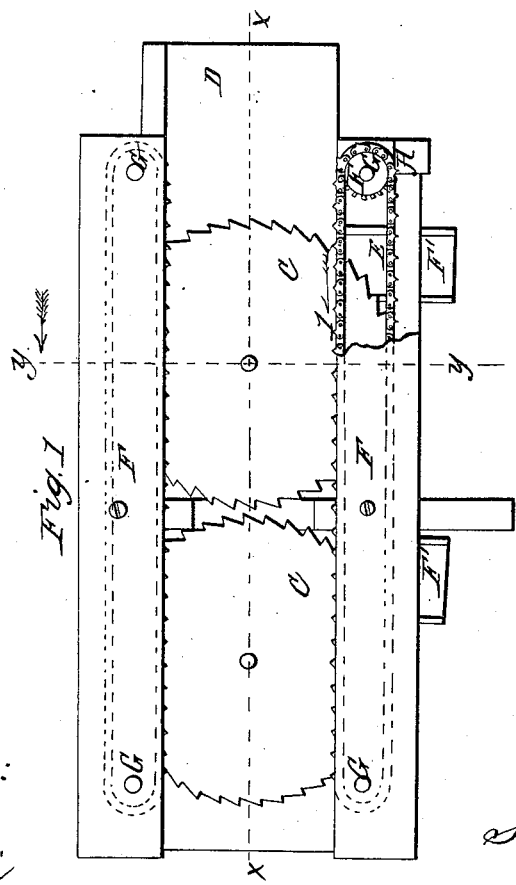
Witnesses:
Theo Tusch
W. Brown
Inventor:
S. E. Anthony
By Munn & Co
Att'ys

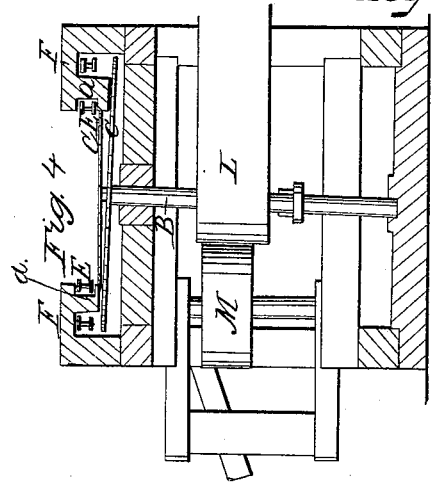
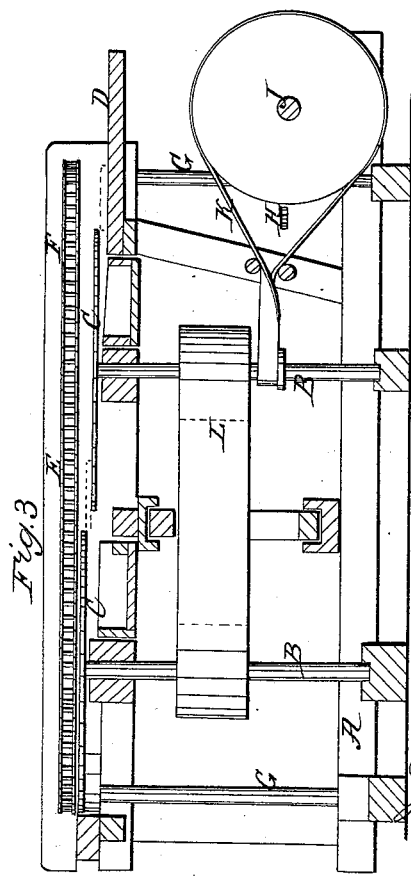

UNITED STATES PATENT OFFICE.

SHERMAN E. ANTHONY, OF STILLWATER, NEW YORK.

IMPROVEMENT IN SHINGLE-MACHINES.

Specification forming part of Letters Patent No. 48,885, dated July 25, 1865.

*To all whom it may concern:*

Be it known that I, SHERMAN E. ANTHONY, of Stillwater, in the county of Saratoga and State of New York, have invented a new and Improved Shingle-Machine; and I do hereby declare that the following is a full, clear, and exact description thereof, which will enable those skilled in the art to make and use the same, reference being had to the accompanying drawings, forming part of this specification, in which—

Figure 1, Sheet No. 1, is a plan or top view of my invention; Fig. 2, a detached plan or top view of the feed mechanism pertaining to the same; Fig. 3, Sheet No. 2, a side sectional view of my invention, taken in the line $x\,x$, Fig. 1; Fig. 4, a transverse vertical section of the same, taken in the line $y\,y$, Fig. 1.

Similar letters of reference indicate corresponding parts.

This invention relates to a new and improved sawing-machine of that class in which circular saws are employed for sawing the shingles from the bolt; and it consists in the employment or use of one or more circular saws having an angular position relatively with each other and with the feed table or platform on which the bolt is fed to the saws, whereby the shingles are sawed from the bolt in proper taper form.

The invention further consists in the employment or use of endless toothed chains arranged and operated, as hereinafter set forth, for feeding the bolt to the saw or saws.

A represents a framing, which is of rectangular form and constructed in any proper manner, and having two shafts, B B, fitted within it, on the upper parts of which circular saws C C are placed. These shafts B B have an inclined position, so that the saws will have an angular position relatively with each other, as shown clearly in Fig. 4, the inclination of one saw being in a reverse or opposite position to that of the other.

D represents a table or bed on which the bolt is fed to the saws, said table or bed having a horizontal position.

The shafts B B may be so placed in the framing A as to be capable of being adjusted vertically in order to vary the thickness of the shingles, and also capable of being adjusted laterally in order to vary their taper form, as may be desired.

The saws C C are placed side by side, so that the bolt will pass from one saw directly to the other, and the bolt is fed over the saws by means of endless toothed chains E E, which pass around toothed pulleys F at the upper ends of shafts G.

There is a chain, E, at each side of the upper part of the framing A, and a cap-piece, F, is placed over each chain, said cap-pieces having each a pendent ledge, $a$, (see Fig. 4,) to keep the chains in proper contact with the bolt, and the shafts G may be so arranged as to be capable of being adjusted laterally to suit bolts of different widths.

The chains E E are operated as follows: The shafts G at one end of the framing A have worm-wheels H upon them, into which screws I gear, the thread of one screw having a reverse position to that of the other. The screws I are upon a shaft, J, which is driven by a belt, K, from one of the saw-shafts B, the saw-shafts being driven by a belt, L, which has a friction-pulley, M, bearing against it. The belt is placed on the table or bed B, and its front end being caught between the endless toothed chains E E it is fed over the saws in the direction indicated by the arrows 1, (see Fig. 1,) each saw cutting a shingle from the bolt in proper taper form. The shingles pass down from the machine through proper inclined spouts F' F'.

Any number of saws may be used, enough, if desired, to cut a bolt entirely up into shingles by one passage of the bolt over the saws. In case a less number of saws is used—two, for instance, as shown in the drawings—the bolt, as it is discharged from the rear end of the machine, may be conveyed to the front end by any proper means, such as an endless belt or an inclined plane.

By this machine shingles may be sawed from the bolt in proper taper form in an expeditious and perfect manner.

Having thus described my invention, I claim as new and desire to secure by Letters Patent—

The circular saws C C, when arranged and operating as described, in combination with the endless toothed chains, for the purposes substantially as set forth.

SHERMAN E. ANTHONY.

Witnesses:
CORNELIUS VANDENBERGH,
HENRY H. MONTGOMERY.